No. 710,884. Patented Oct. 7, 1902.
C. A. PARSONS.
TURBO-COMPRESSOR AND PUMP.
(Application filed July 1, 1901.)
(No Model.) 6 Sheets—Sheet 1.
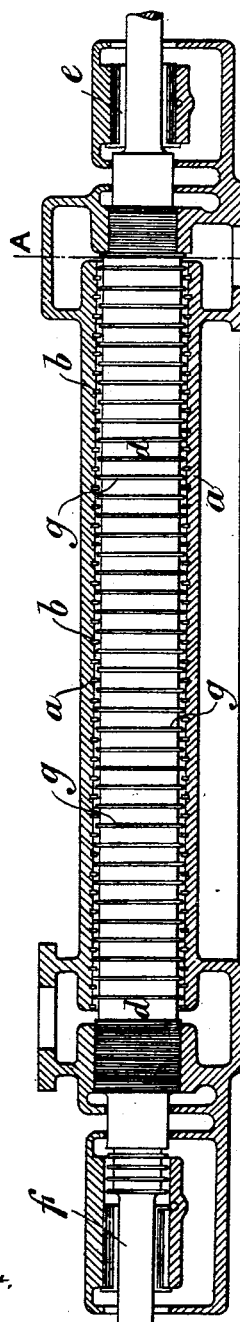
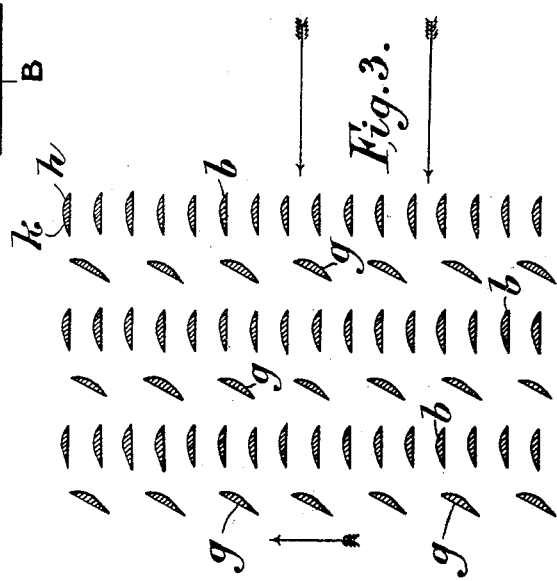
Inventor
Charles A. Parsons.

No. 710,884. Patented Oct. 7, 1902.
C. A. PARSONS.
TURBO-COMPRESSOR AND PUMP.
(Application filed July 1, 1901.)
(No Model.) 6 Sheets—Sheet 2.
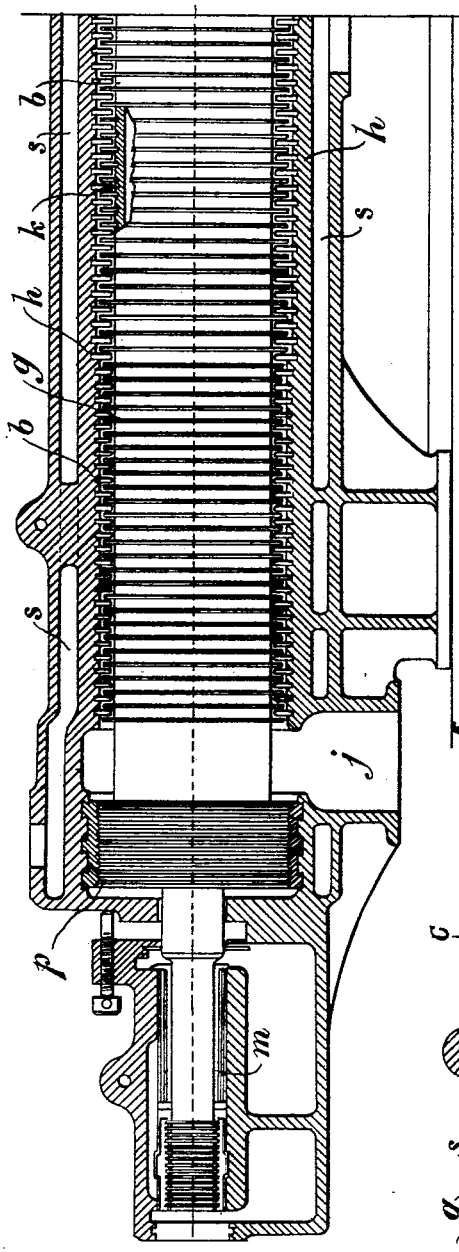
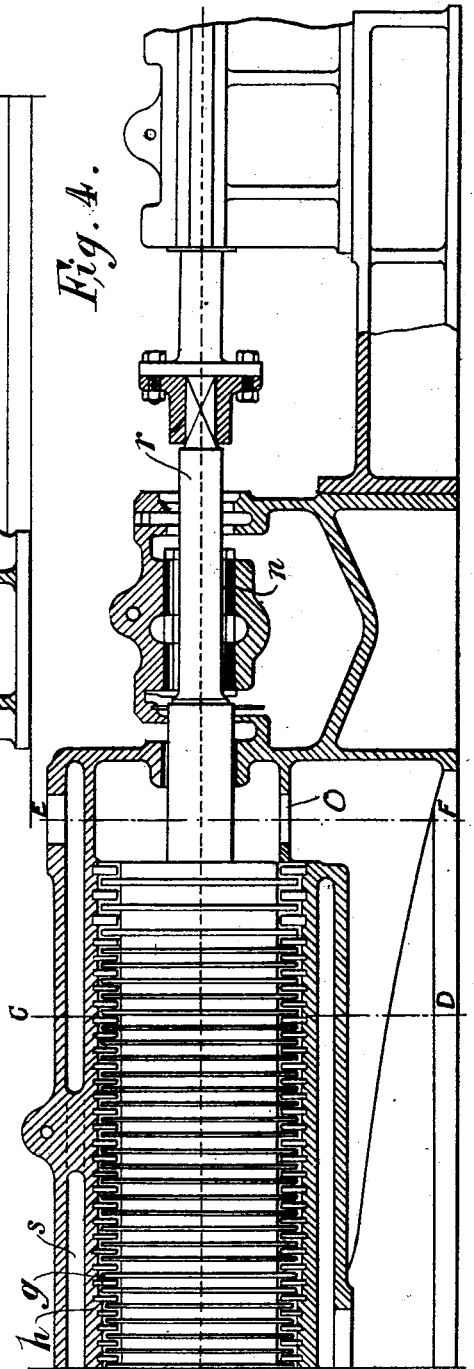

No. 710,884. Patented Oct. 7, 1902.
C. A. PARSONS.
TURBO-COMPRESSOR AND PUMP.
(Application filed July 1, 1901.)

(No Model.) 6 Sheets—Sheet 3.

Attest:
Inventor,
Charles A. Parsons.

No. 710,884. Patented Oct. 7, 1902.
C. A. PARSONS.
TURBO-COMPRESSOR AND PUMP.
(Application filed July 1, 1901.)
(No Model.) 6 Sheets—Sheet 5.

Attest:
O. Middleton
Edw. L. Reed

Inventor:
Charles A. Parsons
by His Atty.

No. 710,884. Patented Oct. 7, 1902.
C. A. PARSONS.
TURBO-COMPRESSOR AND PUMP.
(Application filed July 1, 1901.)
(No Model.) 6 Sheets—Sheet 6.

Attest:
C. S. Middleton
Edw. L. Reed

Inventor.
Charles A. Parsons.
By Ellis Spear
Atty.

UNITED STATES PATENT OFFICE.

CHARLES ALGERNON PARSONS, OF NEWCASTLE-UPON-TYNE, ENGLAND.

TURBO COMPRESSOR AND PUMP.

SPECIFICATION forming part of Letters Patent No. 710,884, dated October 7, 1902.

Application filed July 1, 1901. Serial No. 66,706. (No model.)

*To all whom it may concern:*

Be it known that I, CHARLES ALGERNON PARSONS, engineer, a subject of the King of Great Britain and Ireland, and a resident of Heaton Works, Newcastle-upon-Tyne, in the county of Northumberland, England, have invented certain new and useful Improvements in Turbo Compressors and Pumps, (for which I have made application for a patent in Great Britain, No. 3,060, bearing date February 12, 1901,) of which the following is a specification.

My invention relates to improvements in turbo compressors or pumps; and the object of my invention is to so design a turbine that it shall be capable of propelling a fluid or producing pressure in a fluid with a high efficiency.

My invention consists in a compressor or pump of the turbine type operating by the motion of sets of movable vanes or blades between sets of fixed blades, the movable blades being more widely spaced than in a turbine propelled by steam and constructed with curved surface on the suction side and a flat or somewhat-concave surface on the delivery side and set at a suitable angle to the axis of rotation. The fixed blades may have a similar configuration and be similarly arranged on the containing-casing at any suitable angle, but sometimes may be placed substantially parallel to the axis of rotation.

My invention further consists in the constructions of turbo compressors and pumps to be hereinafter referred to.

Figure 6:
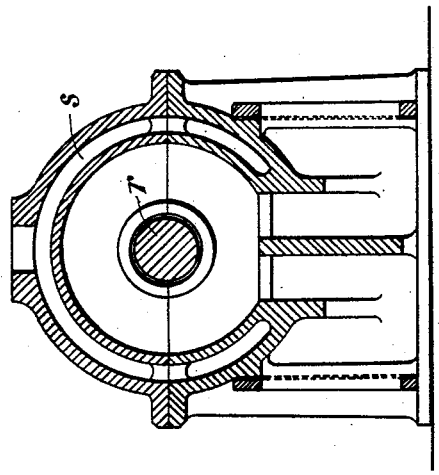
Figure 5:
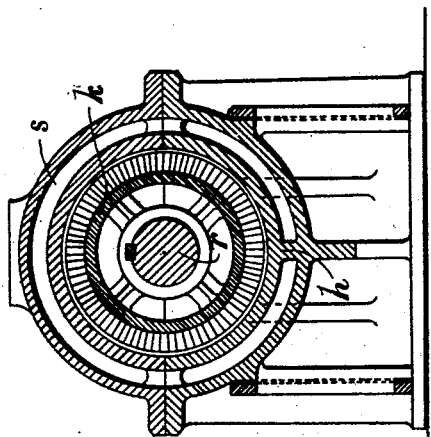
Figure 7:
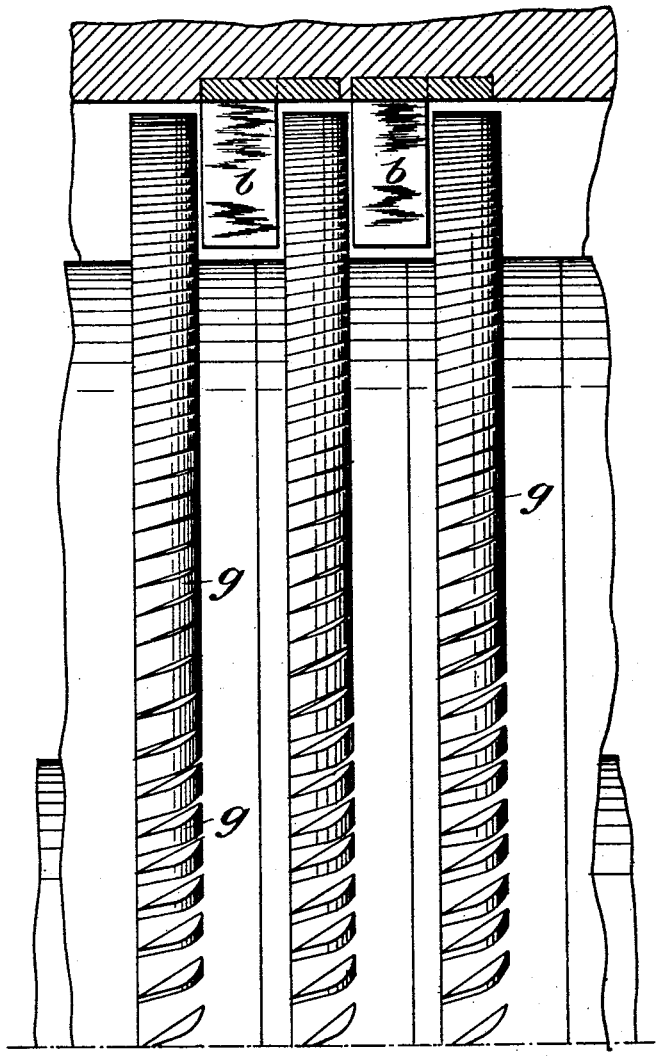
Figure 8:
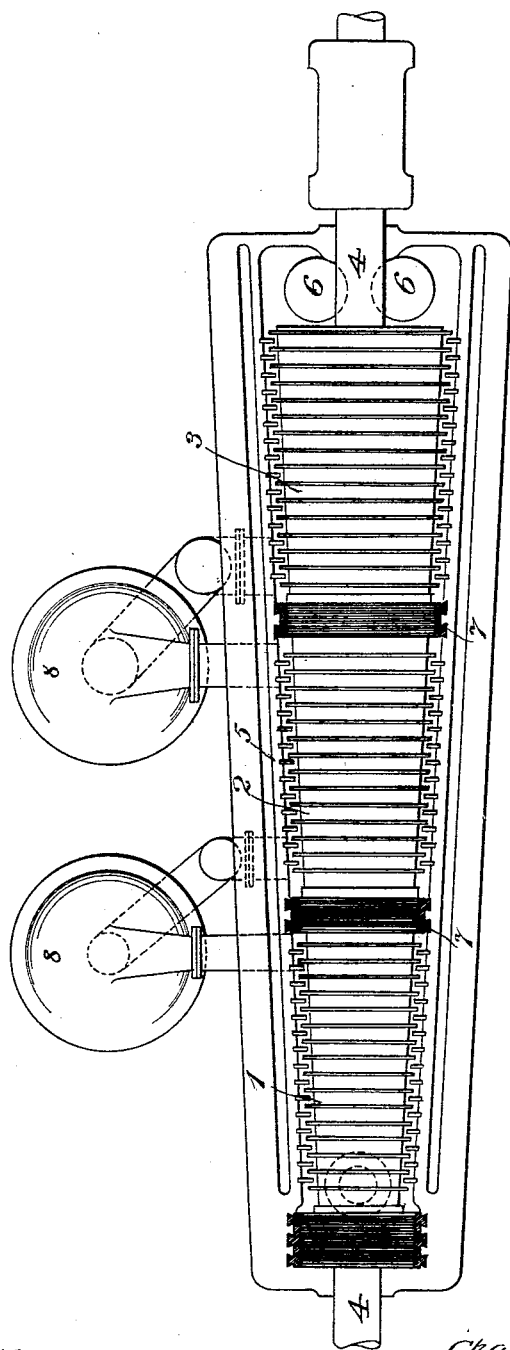
Figure 9:
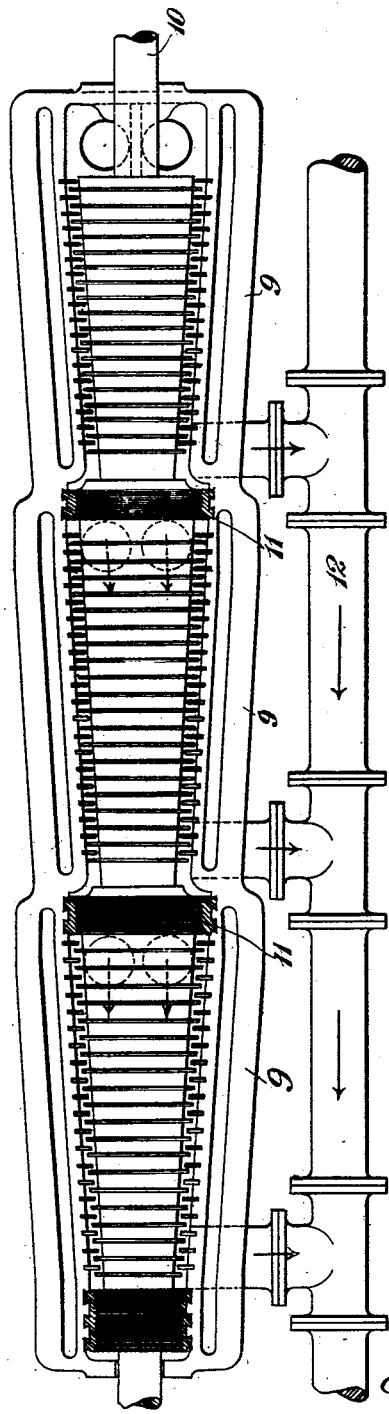

In the accompanying drawings, Figure 1 is a sectional elevation of a turbo-pump constructed in accordance with my invention. Fig. 2 is a vertical cross-section on the line A B of Fig. 1. Fig. 3 is a diagrammatic development of the guide and rotating vanes, showing their arrangement. Fig. 4 is a sectional elevation of my turbo-compressor, the compressor being shown divided into two portions. Figs. 5 and 6 are cross-sections of Fig. 4 on the lines C D and E F, respectively. Fig. 7 is an enlarged detail view of the pump or compressor illustrated in Figs. 1 and 2, the actual arrangement of blades on the rotating part being shown. In this figure the angle of inclination of the moving blades is shown somewhat less than in the diagram in Fig. 3. Fig. 8 is a sectional plan of a turbo-compressor arranged according to one modification of my invention for the purpose of obtaining high compression. Fig. 9 is a similar view and an arrangement of compressor suitable for dealing with large quantities of air or other elastic fluid. In Figs. 1 and 4 the revolving and fixed blades of the pump and compressor are only indicated diagrammatically.

In carrying out my invention according to one modification (illustrated in Figs. 1 and 3 and also in Fig. 7) I provide the turbo-pump with a casing or cylinder $a$ of any usual type bolted together in any suitable manner. Around the interior of this casing $a$ I arrange a number of rows of guide-vanes $b\,b$ at fixed distances from each other, each guide-vane having preferably a plano-convex section, with the convexity tapering off more rapidly toward the suction edge $h$ than toward the delivery edge $k$, as seen in Fig. 3. These blades $b$, which may be arranged on the cylinder parallel or, if desired, at a small angle to the longitudinal axis of the casing, direct the fluid passing through them in steady streams longitudinal or nearly longitudinal through the casing $a$. They also prevent undue spinning of the fluid around the casing and enable each row of rotating blades (to be hereinafter described) to increase the pressure on the fluid within the casing.

The usual drum or shaft $d$, which rotates within the casing $a$, is supported by bearings $e$ and $f$ and carries sets of blades $g$, alternating between the rows of guide-vanes $b$, as shown by the diagram Fig. 3. It may be rotated by a steam-turbine or other suitable means coupled to it on one side of either of the bearings $e$ or $f$. The blades $g$ propel the fluid through the casing and effect compression. They are essentially of the same configuration as the guide-vanes $b$—viz., convex on the suction side and flat or slightly concave on the delivery side—but they are spaced more widely apart than the guide-vanes and more widely apart than the rotating blades of turbines propelled by steam. I set the blades at a suitable angle to the axis of revolution, generally equivalent to a pitch ratio of between one and three.

When the fixed guide-vanes $b$ are set approximately parallel to the axis, I find it preferable to employ a pitch ratio of 1.73 for the rotating blades $g$; but under certain conditions a larger or smaller ratio between the limits mentioned may be found more suitable.

A machine constructed in the manner just described is particularly applicable to a fluid-pump, and when so employed it may be run with a higher efficiency than has hitherto been obtainable in turbo-pumps. Care must be taken, however, to avoid excessive velocities, which would cause cavitation, and consequently loss of efficiency.

In compressing gases I construct a turbo-compressor with a capacity decreasing from the suction to the delivery end of the machine, so as to allow for the change in the volume of the gas due to its compression within the casing. This decreasing capacity may be effected by varying the height of the blades or their pitch coefficient, or both, either in steps or continuously, from the inlet to the exhaust of the compressor.

In carrying out my invention according to this modification, as seen in Figs. 4 to 6, I provide a turbo-compressor with a cylindrical casing $h$, whose internal diameter decreases by three steps toward the delivery end $j$ of the machine. Guide-vanes $b$ $b$, preferably arranged as shown in Fig. 3, are fixed around the inside of the cylinder, their length decreasing toward the delivery end of the machine as the diameter of the cylinder decreases. The hollow drum $k$, supported by bearings $m$ and $n$, rotates within the casing $h$ and carries rows of blades $g$, alternating between the rows of fixed guide-vanes $b$ $b$. The fluid operated upon is drawn into the machine at the port $o$, Fig. 4, and is delivered at the outlet-pipe $j$. At the delivery end of the drum I form a dummy piston $p$ to balance the thrust along the drum due to the pressure on the rotating blades of the compressed gas or fluid. Balancing may also be effected by placing two groups of blades, right and left handed, respectively, on each side of the suction and delivery pipes. The machine may be driven by any suitable means coupled directly or geared to one end of the shaft $r$. To increase the efficiency of compression, I cool the compressor by means of a water-jacket $s$, surrounding the cylinder. I may also cool the rotating drum by circulating water through it.

The blades may be of highly-conducting material, such as copper, and in large compressors they may be hollow with double passages and cooled by forced or natural circulation.

In constructing an air-compressor to deal with about five thousand two hundred cubic feet of air per minute at atmospheric temperature and pressure and to compress it to about twenty pounds per square inch I provide eighty rings of rotating blades arranged on a mean diameter of about fifteen inches, the speed of rotation being four thousand five hundred revolutions per minute. I set the moving blades at an angle of about thirty degrees and the fixed blades parallel to the axis of the drum. A compressor thus constructed has an efficiency of about sixty per cent. Where stage compression is employed, for example, for the purpose of obtaining high pressures in the elastic fluid operated upon, I use two or more turbo-compressors coupled in series, and in order to cool the fluid after each stage of the compression I cause the fluid to traverse a cooler introduced between the exhaust of one compressor and the inlet of the next. The compressors for this purpose may be mounted on separate shafts, or I may employ a single compressor, as shown in Fig. 8. In this case the rotating drums 1 2 3 are mounted on the same shaft 4 within a common casing 5. The working volume of the machine gradually diminishes from the inlet 6, so as to allow for the reduction in volume of the compressed air or other elastic fluid, and between each pair of the drums 1, 2, and 3 a balancing dummy piston 7 is fitted, and the air is by-passed through the coolers 8 for the purpose of diminishing the temperature which it acquires in each stage of the compression.

Where large volumes of air or gas at low pressure have to be dealt with, I sometimes arranged several tubo-compressors 9 on the shaft 10 and with a balancing dummy piston 11 between each pair, as shown in Fig. 9. These compressors act in parallel on the air or gas and discharge into a common collecting-main 12.

The rotating and fixed blades of my improved pump or compressor may be set at other angles than those hereinbefore described; but the pitch ratio, the spacing, and curving of the blades must not be such as to cause gulping or unstable flow of the fluid, gas, or air to be propelled or compressed. The arrangement of blades herein described has not this objection, and it may be considerably modified without incurring it.

Having now described my invention, what I claim as new, and desire to secure by Letters Patent, is—

1. An improved turbo-pump comprising a cylindrical casing provided with suction and delivery passages, groups of guide-vanes of substantially plano-convex cross-section fixed to the casing parallel to its axis, the convexity tapering more rapidly toward the suction edges of the vanes than toward the delivery edges, a rotatable drum within the casing, blades of similar cross-section to said guide-vanes fixed to the drum at an inclination to its direction of rotation, and with a wider pitch than that of the guide-vanes, substantially as set forth.

2. An improved turbo-pump comprising a cylindrical casing provided with suction and delivery passages, groups of guide-vanes of substantially plano-convex cross-section fixed to the casing at an inclination to its axis, the convexity tapering more rapidly toward the suction edges of the vanes than toward the delivery edges, a rotatable drum within the casing, blades, of similar cross-section to said guide-vanes, fixed to the drum at an inclination to its direction of rotation and with a wider pitch than that of the guide-vanes, substantially as set forth.

3. An improved turbo-compressor, comprising a cylindrical casing provided with suction and delivery passages, groups of guide-vanes of substantially plano-convex cross-section fixed to the casing, the convexity tapering more rapidly toward the suction edges of the vanes than toward the delivery edges, a rotatable drum within the casing, blades of similar cross-section to said guide-vanes, fixed to said drum at an inclination to its direction of rotation, and with a wider pitch than that of the guide-vanes, the capacity of each compressor decreasing from its suction end to its delivery end, substantially as set forth.

4. In combination, two or more turbo-compressors each comprising a cylindrical casing, groups of guide-vanes of substantially plano-convex cross-section fixed to the casing, the convexity of said vanes tapering more rapidly toward the suction edges than the delivery edges, a rotatable drum within the casing, blades of similar cross-section to the guide-vanes fixed to said drum at an inclination to its direction of rotation, and with a wider pitch than that of the guide-vanes, pipes connecting the compressors in series, the capacity of the compressors diminishing continuously from the suction to the delivery end of the series, and a gas-cooler connected in the pipe between each pair of compressors, substantially as set forth.

5. In combination, two or more turbo-compressors each comprising a cylindrical casing provided with suction and delivery passages, groups of guide-vanes of substantially plano-convex cross-section fixed to the casing, the convexity tapering more rapidly toward the suction edges of the vanes than toward the delivery edges, a rotatable drum within the casing, blades, of similar cross-section to said guide-vanes, fixed to said drum at an inclination to its direction of rotation, and with a wider pitch than that of the guide-vanes, the capacity of each compressor decreasing from its suction end to its delivery end, and a common collecting main pipe connected to the delivery end of each compressor, substantially as set forth.

In witness whereof I have hereunto set my hand in presence of two witnesses.

CHARLES ALGERNON PARSONS.

Witnesses:
HENRY GRAHAM DAKYNS, Jr.,
WILLIAM MENZIES JOHNSTON.